(12) United States Patent
Duroux

(10) Patent No.: US 6,380,902 B2
(45) Date of Patent: *Apr. 30, 2002

(54) VEHICLE EXTERIOR MIRROR WITH ANTENNA

(76) Inventor: Bernard Duroux, 19 Domaine de la Boisssiere, 78890 Garancieres (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/843,474

(22) Filed: Apr. 26, 2001

Related U.S. Application Data

(63) Continuation of application No. 09/404,101, filed on Sep. 23, 1999.

(30) Foreign Application Priority Data

Sep. 23, 1998 (GB) .............................................. 9820622

(51) Int. Cl.$^7$ ................................................ H01Q 1/32
(52) U.S. Cl. ...................... 343/713; 343/711; 343/712
(58) Field of Search .................... 343/700 MS, 711, 343/712, 713

(56) References Cited

U.S. PATENT DOCUMENTS

| 4,210,357 A | 7/1980 | Adachi |
| 4,868,915 A | 9/1989 | Anderson, III et al. |
| 5,925,272 A | 7/1999 | Lang et al. |
| 6,078,294 A | * 6/2000 | Mitaral ........................ 343/713 |
| 6,081,237 A | 6/2000 | Sato et al. |
| 6,259,412 B1 | * 7/2001 | Duroux ........................ 343/713 |

FOREIGN PATENT DOCUMENTS

| GB | 1 590 824 | 6/1981 |
| GB | 2 157 633 A | 10/1985 |
| WO | WO 91/00626 | 1/1991 |
| WO | WO 95/19598 | 7/1995 |
| WO | WO 97/21127 | 6/1997 |
| WO | WO 97/32355 | 9/1997 |

* cited by examiner

*Primary Examiner*—Don Wong
*Assistant Examiner*—Shih-Chao Chen
(74) *Attorney, Agent, or Firm*—Jones, Day, Reavis & Pogue

(57) ABSTRACT

An exterior rear view mirror for a motor vehicle comprises a case containing a reflective member and an antenna, consisting of an electrically conductive layer on a surface of the case, for transmitting and/or receiving radio frequency electromagnetic radiation. The electrically conductive layer has at least one zone having its periphery shaped in accordance with the frequency of said electromagnetic radiation.

35 Claims, 2 Drawing Sheets

VEHICLE EXTERIOR MIRROR WITH ANTENNA

RELATED APPLICATIONS

This application is a continuation of U.S. Ser. No. 09/404,101 filed Sep. 23, 1999.

FIELD

This invention relates to an exterior rear view mirror for a motor vehicle comprising a case containing a mirror glass or other reflective member and an antenna for transmitting and/or receiving radio frequency electromagnetic radiation comprising an electrically conductive layer on a surface of the case.

RELATED ART

An exterior mirror of this type is disclosed in GB-A-1590824. The case comprises a body moulded from plastics material having a bright copper layer deposited on substantially the whole of its outer surface for receiving a chromium-plated outer layer. The bright copper layer also serves as an antenna.

SUMMARY OF THE INVENTION

According to the invention, in a rear-view mirror assembly of the type described above, the antenna comprises an electrically conductive layer on a surface of a rigid member forming part of the mirror assembly.

DETAILED DESCRIPTION OF THE PREFERRED EMBODIMENT

Figure 1:
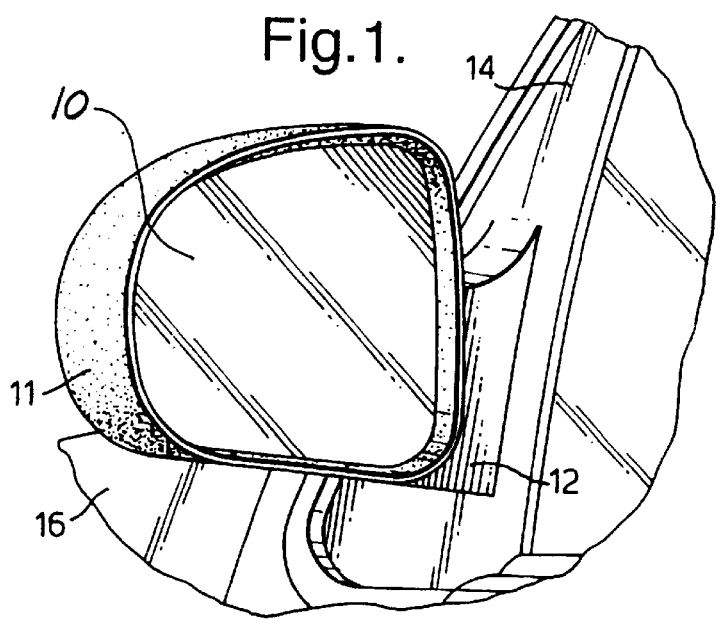
FIG. 1 is a perspective view of a vehicle exterior mirror in accordance with the invention.
Figure 2:
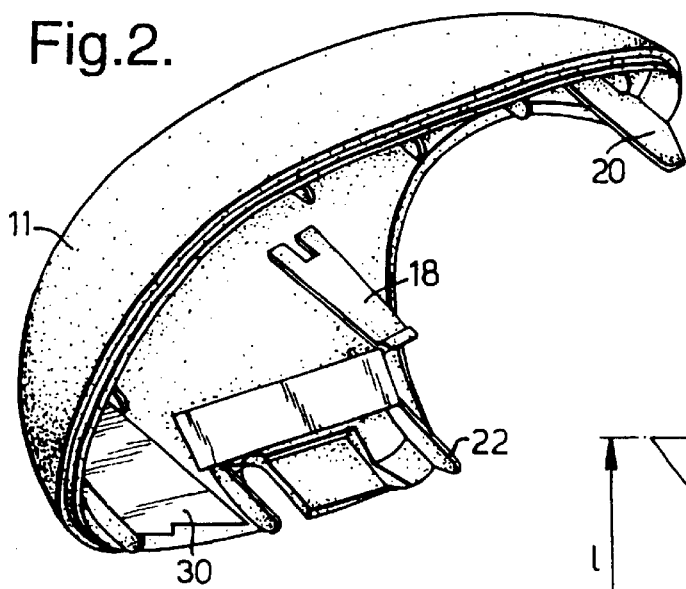
FIG. 2 is a perspective view of the case of the mirror shown in FIG. 1.
Figure 7:
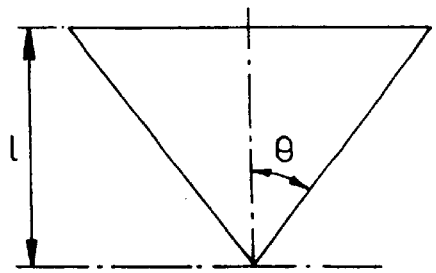
FIG. 7 is a diagram illustration dimensions of a theoretical conical antenna.
Figure 3:
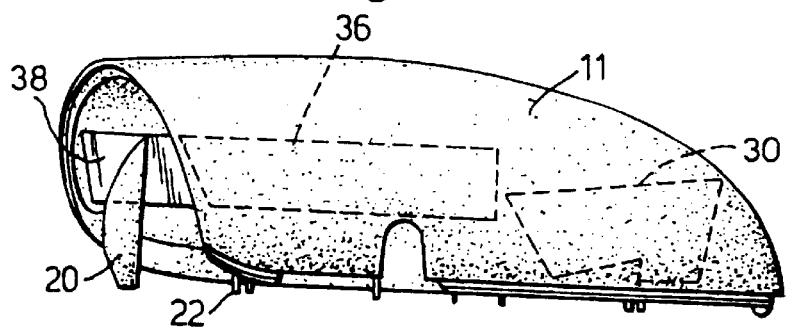
FIG. 3 is a perspective view of the mirror case shown in FIG. 2, from a different angle.
Figure 4:
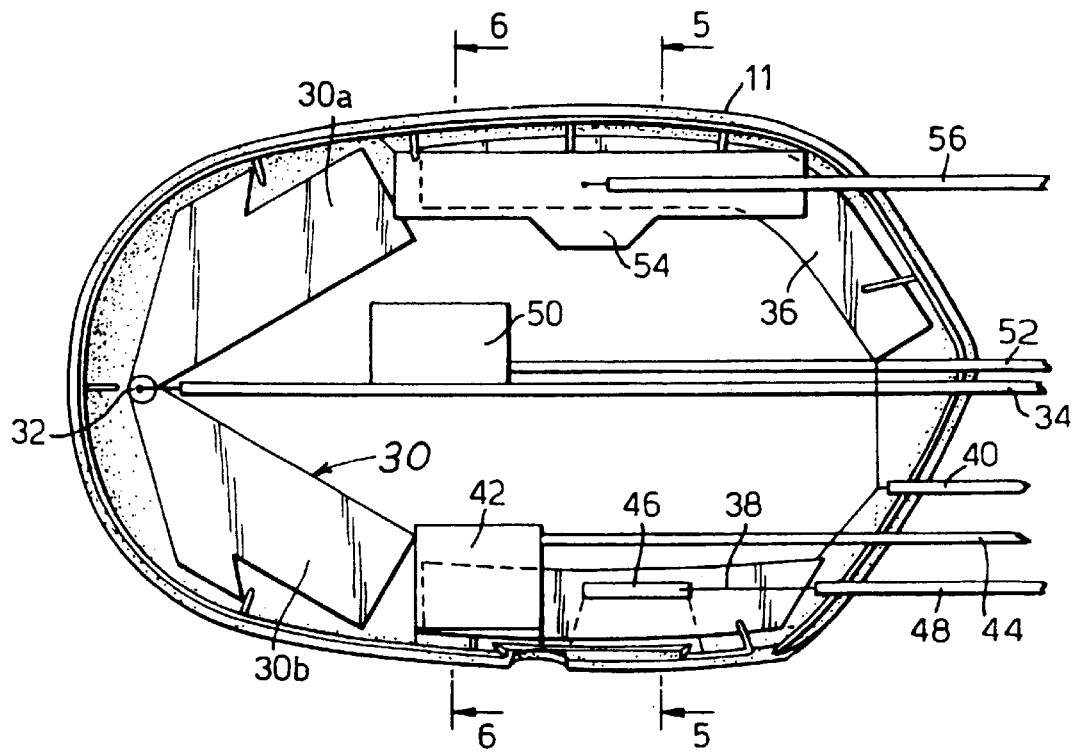
FIG. 4 is a view into the mirror case of FIGS. 2 and 3 through the opening in which the mirror glass would be mounted.
Figure 5:
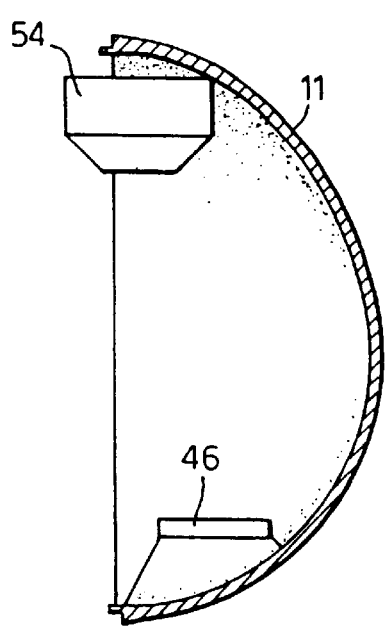
FIG. 5 is a cross-sectional view taken on the line 5—5 in FIG. 4.
Figure 6:
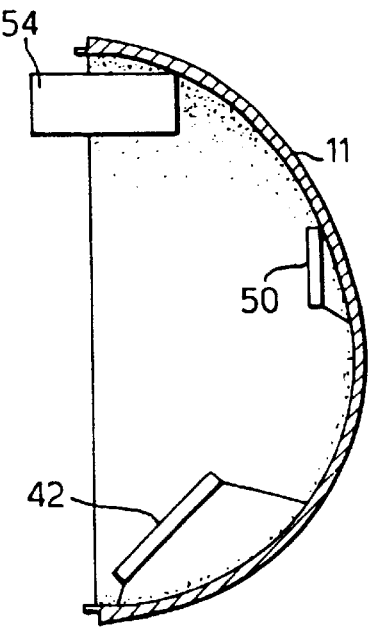
FIG. 6 is a cross-sectional view taken on the line 6—6 in FIG. 4.

FIG. 1 shows a vehicle rear-view mirror comprising a reflective member 10 fitted in a case 11, which is mounted on a bracket 12, which is secured to one of the front doors 14 of a motor car 16. As can be seen from FIG. 2, the case 11 has a clip 18 and guides 20 and 22 by means of which it is secured to an internal frame member (not shown) of the mirror assembly. In accordance with the invention, a first metallic foil element 30 is secured by adhesive to the inside surface of the outboard end of the case 11. As can best be seen from FIG. 4, the element 30 is formed in two symmetrical halves 30a and 30b interconnected by a link part 32 which is connected by a coaxial cable 34 to a mobile telephone (not shown). The two symmetrical halves 30a and 30b approximate to a conical antenna. FIG. 7 shows a cone of half cone angle θ and length ⌊. Theoretically ⌊ should be equal to wavelength λ of the radio signals (i.e. the speed of light divided by the centre frequency). In practice, acceptable results are achieved if ⌊ is three tenths of the theoretical value.

The theoretical formula for the feed-point impedance (Zk) of a conical antenna is:

$$Zk = (Zo/\pi) Ln \, cotg(\theta/2)$$

where Zo is the free space impedance (377 ohms in air) and "Ln cotg" means "logarithmic cotangent". 30° is a realistic practical value for θ.

The relationship between the angle θ and the impedance of the antenna is linear. Good reception can be obtained if the actual feed-point impedance is between half and twice its optimum value. Provided this condition is met, it can be shown from FIG. 8–15 on page 355 of John D. Kraus, "Antennas", published by McGraw Hill, ISBN 0-07-0354-22-7, that, because the curve is practically linear in the area used, a practical optimised value Zo for the actual feed-point impedance is:

$$Zo = 1500(\lfloor/\lambda) - 113 - 3$$

It follows that the length ⌊ of the foil elements 30a and 30b and the half-cone angle θ is:

$$(Zo/\pi) Ln \, Cotg \, \theta/2 = 1500(\lfloor/\lambda) - 113 - 3$$

In practice, the length ⌊ of foil element may be about three tenths of the wavelength λ.

Two other foil elements 36 and 38 that are a mirror image of one another are secured by adhesive to the central and inboard parts of the interior surface of the case 11. These foil elements 36 and 38 are connected by a cable 40 to a radio broadcast receiver, for example an FM radio receiver (not shown).

In addition to the above two antennae, a third antenna 42 is connected by a cable 44 to a transponder (not shown) for an automatic road toll charging system; a fourth antenna 46 is connected by a cable 48 to a controller for the central door locking system for the car 16. Another antenna 50, positioned in the centre of the mirror case 11 is connected by a cable 52 to a digital radio receiver (not shown) while a further antenna 54 is connected by a cable 56 to a GPS receiver (also not shown).

The antennae 42, 46, 50 and 54 are rigid antennae mounted within the case 11. Although the various cables 34, 40, 44, 48, 52 and 56 are shown as parallel to one another, in practice they are gathered together so as to extend through the interior of the bracket 12 into the interior of the car 16, where they are connected to their respective transmitters and/or receivers.

Antennae comprising metal inserts moulded into the case 11 may replace the foil antennae 30, 36 and 38. Another alternative is for the case or cover member to be formed as co-moulding of two different plastics material, only one of which will accept surface metallisation. A layer of metal is then deposited on this part to serve as the antennae.

If the case has a separate decorative exterior cover member of the type described in European Patent Application No. 98302674.1, the electrically conductive layer may be formed either on the inner surface of such cover member or on that part of the outer surface of the mirror case which is enclosed by the cover member.

Alternatively or additionally one or more antennae may take the form of a conductive layer on part of the mounting for the mirror glass or other reflective member.

The mirror assembly may in addition incorporate other antennae for receiving GPS signals, remote operation of the car door locks and transponders for automatic road toll accounting systems. Some of these additional antennae may be formed as self-supporting rigid members.

What is claimed is:

1. A rear view mirror assembly for motor vehicles, said mirror assembly including a mirror case and a reflective member, said mirror case having a mirror case interior with an interior surface, and said interior surface having a conductive layer thereon forming an antenna for receiving and/or transmitting radio frequency signals.

2. The rear view mirror assembly of claim 1 wherein said conductive layer comprises metal foil secured to said interior surface.

3. The rear view mirror assembly of claim 1 wherein said conductive layer comprises metallization deposited on said interior surface.

4. The rear view mirror assembly of claim 1 wherein said interior surface having said conductive layer thereon is curved to the general shape of at least a portion of a conical antenna.

5. A rear view mirror assembly for motor vehicles, said mirror assembly including a mirror case having a mirror case interior with an interior surface, a pair of mirror image conductive layers on said interior surface, and said conductive layers being connected at one end and providing an antenna for receiving and/or transmitting radio frequency signals.

6. The rear view mirror assembly of claim 5 wherein said interior surface is curved to provide said pair of conductive layers with the shape of at least a portion of a conical antenna.

7. The rear view mirror assembly of claim 6 wherein said pair of conductive layers comprise metal foil secured to said interior surface.

8. A rear view mirror assembly for motor vehicles, said mirror assembly including a mirror case having a curved interior surface that is curved to the general shape of at least a portion of a conical antenna, and a conductive layer on said curved interior surface to provide an antenna for receiving and/or transmitting radio frequency signals.

9. The rear view mirror assembly of claim 8 wherein said conductive layer comprises metal foil secured to said curved interior surface.

10. The rear view mirror assembly of claim 8 wherein said conductive layer comprises metallization deposited on said curved interior surface.

11. A rear view mirror assembly for motor vehicles, said mirror assembly including a mirror case, a reflective member and a plurality of different antennas for receiving and/or transmitting radio frequency signals, said mirror case having a mirror vase interior and at least one of said plurality of different antennas being shaped as at least a portion of a conical antenna within said mirror case interior.

12. The rear view mirror assembly of claim 11 wherein said mirror case interior includes an interior curved surface that is curved to accommodate said antenna that is shaped as at least a portion of a conical antenna.

13. The rear view mirror assembly of claim 12 wherein said antenna that is shaped as at least a portion of a conical antenna is on said curved surface.

14. The rear view mirror assembly of claim 13 wherein said antenna that is shaped as at least a portion of a conical antenna comprises a conductive layer.

15. A rear view mirror assembly for motor vehicles, said mirror assembly including a mirror case, a reflective member and a plurality of different antennas for receiving and/or transmitting radio frequency signals, said mirror case having a mirror case interior that includes an interior surface, and at least one of said plurality of different antennas comprises a conductive layer on said interior surface.

16. The rear view mirror assembly of claim 15 wherein said conductive layer comprises metallic foil.

17. The rear view mirror assembly of claim 16 wherein said metallic foil is adhesively secured to said interior surface.

18. The rear view mirror assembly of claim 17 wherein said metallic foil is in two symmetrical halves.

19. The rear view mirror assembly of claim 18 wherein said two symmetrical halves have the shape of at least a portion of a conical antenna.

20. A rear view mirror assembly for motor vehicles, said mirror assembly including a mirror case, a reflective member and a plurality of different antennas for receiving and/or transmitting radio frequency signals, one of said plurality of different antennas being for transmitting and receiving mobile telephone signals.

21. A rear view mirror assembly for motor vehicles, said mirror assembly including a mirror case, a reflective member and a plurality of different antennas for receiving and/or transmitting radio frequency signals, one of said plurality of different antennas being for receiving FM radio signals.

22. A rear view mirror assembly for motor vehicles, said mirror assembly including a mirror case, a reflective member and a plurality of different antennas for receiving and/or transmitting radio frequency signals, said mirror being on a vehicle having electrically operated door locks, and one of said plurality of different antennas being for remote operation of the car door locks.

23. A rear view mirror assembly for motor vehicles, said mirror assembly including a mirror case and a reflective member, said mirror case having a mirror case interior, a plurality of different antennas within said mirror case interior for receiving and/or transmitting radio frequency signals of different frequencies, and one of said plurality of different antennas being for transmitting and receiving mobile telephone signals.

24. A rear view mirror assembly for motor vehicles, said mirror assembly including a mirror case and a reflective member, said mirror case having a mirror case interior, a plurality of different antennas within said mirror case interior for receiving and/or transmitting radio frequency signals of different frequencies, and one of said plurality of different antennas being for receiving FM radio signals.

25. A rear view mirror assembly for motor vehicles, said mirror assembly including a mirror case and a reflective member, said mirror case having a mirror case interior, a plurality of different antennas within said mirror case interior for receiving and/or transmitting radio frequency signals of different frequencies, said mirror being on a vehicle having electrically operated door locks, and one of said plurality of different antennas being for remote operation of the car door locks.

26. A rear view mirror assembly for motor vehicles, said mirror assembly including a mirror cast and a reflective member, said mirror case having a mirror case interior, a plurality of different antennas within said mirror case interior for receiving and/or transmitting radio frequency signals of different frequencies, said mirror case interior having an interior surface, and at least one of said plurality of different antennas comprising a conductive layer on said interior surface.

27. The rear view mirror assembly of claim 26 wherein said conductive layer comprises metallic foil secured to said interior surface by adhesive.

28. The rear view mirror assembly of claim 26 wherein said conductive layer comprises metallization deposited on said interior surface.

29. The rear view mirror assembly of claim 26 wherein said interior surface includes an interior curved surface and said conductive layer has a curvature generally corresponding to said interior curved surface.

30. The rear view mirror assembly of claim 26 wherein said conductive layer has the shape of at least a portion of a conical antenna.

31. The rear view mirror assembly of claim 26 wherein said conductive layer comprises a pair of individual sublayers that are mirror images of one another and are connected at one end.

32. The rear view assembly of claim 31 wherein said pair of sublayers together have the shape of at least a portion of a conical antenna.

33. The rear view mirror assembly of claim 31 wherein said pair of sublayers comprise metal foil adhesively secured to said mirror case interior surface.

34. A rear view mirror assembly for motor vehicles, said mirror assembly including at least two different antennas that have different physical shapes and are for receiving and/or transmitting different radio frequency signals, said assembly including a mirror case having a mirror case interior, said two different antennas being within said mirror case interior, said mirror case interior including an interior surface, and at least one of said different antennas comprising a conductive layer on said interior surface.

35. The rear view mirror assembly of claim 34 wherein said conductive layer comprises metal foil bonded to said interior surface.

* * * * *

UNITED STATES PATENT AND TRADEMARK OFFICE
CERTIFICATE OF CORRECTION

PATENT NO. : 6,380,902 B2
DATED : April 30, 2002
INVENTOR(S) : Bernard Duroux

It is certified that error appears in the above-identified patent and that said Letters Patent is hereby corrected as shown below:

<u>Column 3,</u>
Line 53, change "vase" to -- case --

<u>Column 4,</u>
Line 57, change "cast" to -- case --

Signed and Sealed this

Second Day of July, 2002

*Attest:*

JAMES E. ROGAN
*Attesting Officer*  *Director of the United States Patent and Trademark Office*